US007509735B2

(12) United States Patent

Philip et al.

(10) Patent No.: US 7,509,735 B2

(45) Date of Patent: Mar. 31, 2009

(54) IN-FRAME REPAIRING SYSTEM OF GAS TURBINE COMPONENTS

(75) Inventors: Vinod Philip, Orlando, FL (US); Brij Seth, Maitland, FL (US); Paul Zombo, Cocoa, FL (US); Dennis Nagle, Ellicott City, MD (US)

(73) Assignee: Siemens Energy, Inc., Orlando, FL (US)

( * ) Notice: Subject to any disclaimer, the term of this patent is extended or adjusted under 35 U.S.C. 154(b) by 709 days.

(21) Appl. No.: 10/829,721

(22) Filed: Apr. 22, 2004

(65) Prior Publication Data

US 2005/0235493 A1 Oct. 27, 2005

(51) Int. Cl.
*B23P 6/00* (2006.01)

(52) U.S. Cl. .................................................... 29/889.1

(58) Field of Classification Search ................ 29/889.1, 29/81.01–81.09; 451/102, 76, 91, 99
See application file for complete search history.

(56) References Cited

U.S. PATENT DOCUMENTS 2,723,498 A * 11/1955 Hastrup et al. ................ 451/88
2,846,822 A 8/1958 Steffen et al.
3,075,318 A 1/1963 Dillard et al.
4,004,047 A 1/1977 Grisik
4,067,150 A * 1/1978 Merrigan ..................... 451/99
4,333,277 A 6/1982 Tasedan
4,563,840 A 1/1986 Urakami
4,624,080 A 11/1986 Jakobsson
4,646,480 A 3/1987 Williams
4,705,203 A 11/1987 McComas et al.
4,728,488 A 3/1988 Gillett et al.
5,102,031 A 4/1992 Heitman et al.
5,197,191 A * 3/1993 Dunkman et al. .......... 29/889.1
5,225,650 A 7/1993 Babel et al.
5,254,413 A 10/1993 Maricocchi
5,334,417 A 8/1994 Rafferty et al.
5,419,971 A 5/1995 Skelly et al.
5,437,737 A 8/1995 Draghi et al.
5,549,767 A 8/1996 Pietruska et al.
5,575,825 A * 11/1996 Iida et al. ...................... 51/307
5,785,581 A * 7/1998 Settles ......................... 451/99
5,932,120 A 8/1999 Mannava et al.
5,956,845 A 9/1999 Arnold
5,975,996 A * 11/1999 Settles ........................ 451/102
6,010,746 A 1/2000 Descoteaux et al.

(Continued)

FOREIGN PATENT DOCUMENTS

JP 363300867 * 12/1988

*Primary Examiner*—John C Hong

(57) ABSTRACT

A method for in-frame repairing of a thermal barrier coating (12) on a gas turbine component includes cleaning a desired surface portion (10) of the component without removing the component from the gas turbine. The method also includes roughening the surface portion in-frame, applying a bond coat (68) to the surface portion in-frame, and applying a ceramic topcoat (70) to the bond coat, in-frame. A system (28) for cleaning the surface portion in-frame includes an abrasive media (34) having a state change characteristic occurring at a temperature lower than an operating temperature of the gas turbine so that the abrasive media changes from a solid state to another state allowing the media to exit the gas turbine during operation. The system also includes an abrasive media sprayer (36) to direct a spray of the abrasive media at the desired surface portion.

5 Claims, 3 Drawing Sheets

U.S. PATENT DOCUMENTS 6,036,995 A 3/2000 Kircher et al.
6,042,880 A 3/2000 Rigney et al.
6,045,863 A 4/2000 Olson et al.
6,235,352 B1 5/2001 Leverant et al.
6,328,810 B1 12/2001 Conner et al.
6,368,727 B1 4/2002 Ritter et al.
6,395,214 B1 5/2002 Kear et al.
6,413,578 B1 7/2002 Stowell et al.
6,417,477 B1 7/2002 Brown et al.
6,444,259 B1 9/2002 Subramanian et al.
6,447,377 B1 * 9/2002 Londenberg et al. .......... 451/90
6,455,167 B1 9/2002 Rigney et al.
6,485,655 B1 11/2002 Das et al.
6,485,792 B1 11/2002 Grylls et al.
6,494,960 B1 12/2002 Macdonald et al.
6,500,269 B2 12/2002 Risbeck et al.
6,503,574 B1 1/2003 Skelly et al.
6,555,179 B1 4/2003 Reeves et al.
6,558,614 B1 * 5/2003 Fritz .......................... 266/44
6,569,492 B2 5/2003 Femihough et al.
6,607,789 B1 8/2003 Rigney et al.
6,609,894 B2 8/2003 Jackson et al.
6,637,643 B2 10/2003 Hasz et al.
6,641,628 B1 11/2003 Oshio et al.
7,032,279 B2 * 4/2006 McCarvill et al. .......... 29/90.01
2001/0004473 A1 6/2001 Strutt et al.
2003/0008764 A1 1/2003 Wang et al.
2003/0077398 A1 4/2003 Strutt et al.
2003/0167636 A1 * 9/2003 Bose et al. ................ 29/889.1
2005/0129868 A1 * 6/2005 Philip et al. ................ 427/452

* cited by examiner

IN-FRAME REPAIRING SYSTEM OF GAS TURBINE COMPONENTS

FIELD OF THE INVENTION

This invention relates generally to in-frame repair of ceramic thermal barrier coatings on components in gas turbines.

BACKGROUND OF THE INVENTION

Ceramic thermal barrier coatings (TBC's) are well known for protecting superalloys or ceramic matrix composite material substrates from high temperature environments in a gas turbine. One type of thermal barrier coating used to protect a nickel-based or cobalt-based superalloy component includes an "MCrAlY" bond coat, where M is iron, nickel, cobalt or a combination thereof, that functions primarily as an intermediate bonding layer for the Ceramic Top Coat. A typical composition of this ceramic layer is Yttria Stabilized Zirconia (YSZ). The ceramic layer is typically deposited by air plasma spraying (APS), low pressure plasma spraying (LPPS), or by a physical vapor deposition (PVD) technique, such as electron beam physical vapor deposition (EBPVD) that yields a strain-tolerant columnar grain structure. Although these coatings have been designed to have a service life of several thousand hours, the coatings may be damaged during their service operation. For example, localized loss, or spallation, of the ceramic layer may occur as a result of foreign-object-damage (F.O.D.) or erosive wear from particulate matter carried by hot gases flowing through the gas turbine. The spallation of the ceramic layer exposes the underlying bond coat to hot combustion gas temperatures, resulting in accelerated oxidation of the bond-coat. The exposed MCrAlY bond-coat may be rapidly consumed, eventually leading to the oxidation of the substrate. Excessive substrate oxidation may lead to catastrophic failure of the component. Traditionally, occurrences of TBC damage in gas turbines have been addressed by shutting down the gas turbine, removing the parts having damaged TBC's, and replacing them with spare parts. The damaged components are then shipped to repair facilities for repair, recoating, and eventual return to service.

BRIEF DESCRIPTION OF THE DRAWINGS

The invention will be more apparent from the following description in view of the drawings that show.

DETAILED DESCRIPTION OF THE INVENTION

Figure 1A:
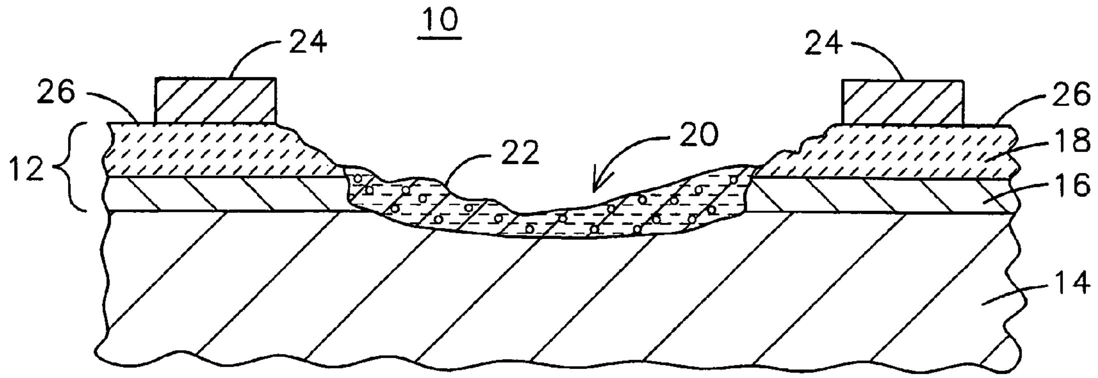
FIGS. 1A-E are cross sectional representations of a surface portion of a gas turbine component during an in-frame repair of a TBC of the component.

Conventional methods of removal and repair of TBC coatings of gas turbine components may be prohibitively expensive and time consuming. In place, or in-frame, repair methods that do not require removal of a component to be repaired from the gas turbine have been proposed, but the longevity of such repairs may be limited. The present inventors have developed an innovative system and method of performing in-frame repair of TBCs of gas turbine components that may provide a service life of the repaired component comparable to, or at least a majority portion of a service life of a component re-coated within a shop-floor environment. In laboratory tests performed on components repaired using this innovative method, service lives for the repaired components have ranged from 8,000 to 24,000 service operation hours, a service life length that may not be achievable by other proposed in-frame methods. Unlike conventional techniques that require removal, repair, and later reinstallation of the component to achieve a desired service life of the repaired component, the innovative repair method described below may be performed while the component remains installed, or in-frame, in the gas turbine, reducing the time and cost required for the repair compared to using conventional methods.

FIGS. 1A-E are cross sectional representations of a surface portion 10 of a gas turbine component during an in-frame repair of the TBC 12 of the component. The TBC 12 may include a bond coat 16, for example, comprising MCrAlY, deposited on a substrate 14 of the component, such as nickel, cobalt, or iron-based superalloy substrate, and a ceramic top-coat 18 deposited on top of the bond coat 16. The bond coat 16 enables the ceramic top coat to better adhere to the substrate 14, while also providing an oxidation-resistant barrier for the substrate 14. During operation of the gas turbine, components may become damaged, for example, as a result of F.O.D. contact within the gas turbine or erosion from particulate matter in the hot combustion gases, that may result in spallation of the ceramic top coat 18 in a localized region 20. Such damage may expose the bond coat 16. Consequently, the bond coat 16 is exposed to the hot-gas path temperatures and gases and tends to undergo accelerated oxidation. The exposure of the bond coat 16 may result in the formation of an oxidized region 22. If oxidation of the bond coat 16 is allowed to progress, the underlying substrate 14, such as a superalloy substrate, may become oxidized which may, in extreme cases, result in the catastrophic failure of the component (for example, due to wall thinning and subsequent overstress) if the localized region 20 is not repaired.

Generally, the in-frame repair method includes the steps of cleaning a desired surface portion of the gas turbine component without removing the component from the gas turbine, roughening the desired surface portion, applying a MCrAlY bond coat to the desired surface portion, and applying a ceramic topcoat to the bond coat. TBC coated components, such as turbine vanes, blades, shrouds, and combustor liners, may be repaired according to the innovative method by using tools configured for insertion and operation within an enclosed portion of the gas turbine, such as within an inner casing or combustor chamber of the gas turbine. Design of such tools is well within the comprehension of one skilled art, as shown, for example, in U.S. Pat. No. 6,010,746.

Initially, a damaged portion of the TBC of a gas turbine component may be identified during a routine inspection of gas turbine, such as may be performed by inserting a borescope within an inner casing of the gas turbine to view vanes and blades housed therein. When a damaged surface portion in a localized region 20 is identified and a repair is desired, the surface potions 26 adjacent to the localized region 20 may be covered by a mask 24 to prevent subsequent repair steps from affecting adjacent, undamaged surface potions 26. In addition, component cooling holes and gaps between adjacent components may be masked in the vicinity of the localized region 20. For example, high temperature metallic tapes, polymeric masking media, or other such materials as known in the art may be used to mask the adjacent surface portions 26.

Figure 2:
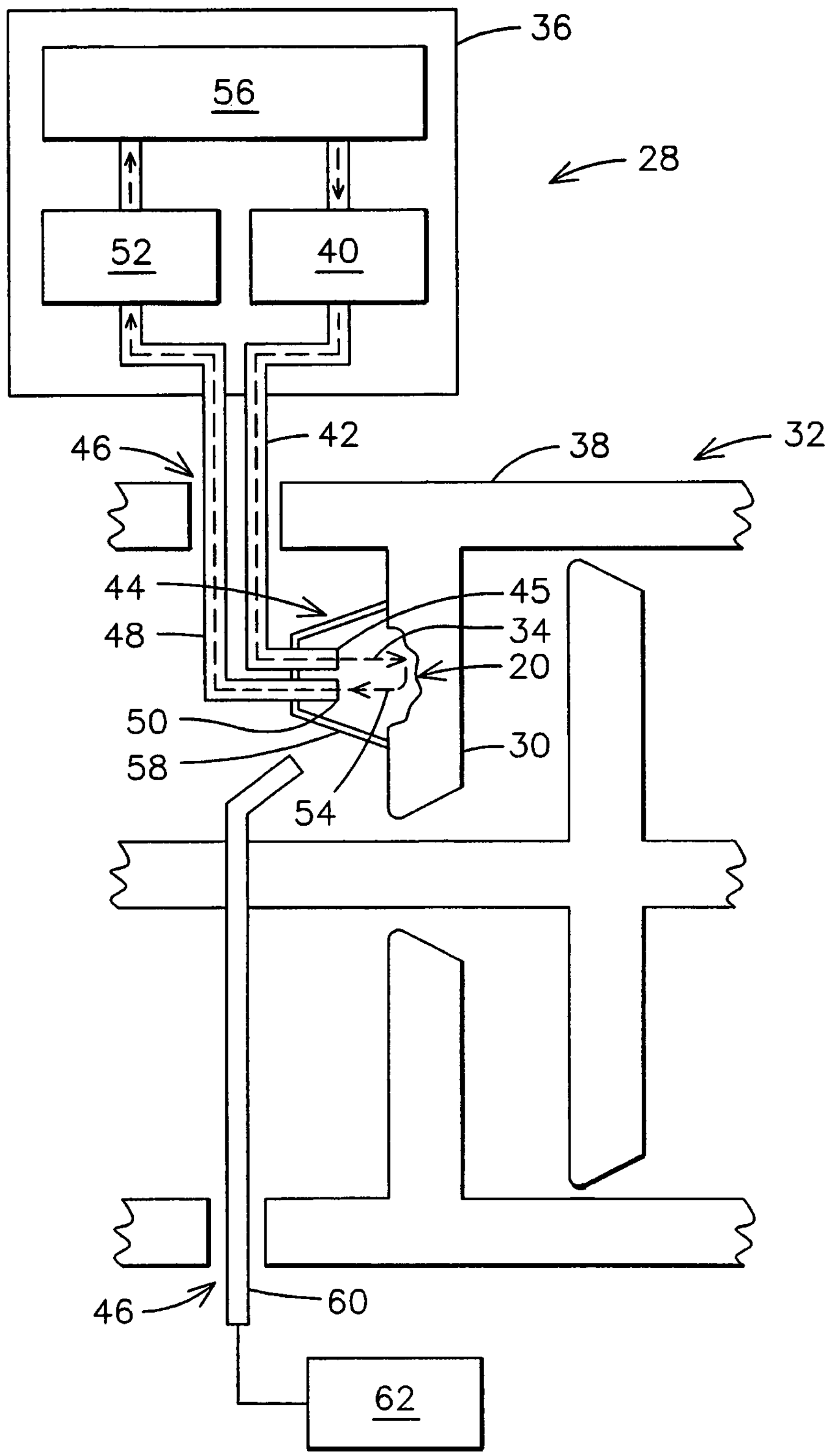
FIG. 2 is a cross sectional schematic representation of a system for removing a portion of a TBC from an in-frame gas turbine component.

FIG. 2 is a cross sectional schematic representation of a system 28 for removing a portion of a TBC 12 from an in-frame gas turbine component. As shown in FIG. 2, surface portions of components that have experienced spallation of the ceramic topcoat 18 typically forms an oxidized surface layer 22 (such as either on the bond coat 16 or on the substrate 14) that must be removed to ensure that a subsequent repair coating adheres to the surface of the component. The service life of a repair may be limited if such oxides are not adequately removed due to ineffective bonding that may lead to premature spallation of the coating. Accordingly, the inventors have innovatively developed a system 28 for removing these oxides without requiring removal of the components from the gas turbine 32.

The system 28 generally includes an abrasive media 34 selected for use within a gas turbine engine, and an abrasive media sprayer 36 having an outlet end 44 configured for being positioned within a gas turbine 32, such as within an inner casing 38, to selectively abrade a damaged localized region 20 of the surface of a gas turbine component, such as a vane 30. The sprayer 36 may include a compressor 40, in communication with a media hopper 56, for compressing a fluid, such as air, for transporting the media 34 through a spray conduit 42 to an outlet 45 where the media is discharged against the localized region 20 to abrade away a desired portion of the surface of the component. The outlet end 44 of the sprayer 36 may be made sufficiently small to be inserted within an enclosed portion of the gas turbine 32, such as through an opening 46 in the inner casing 38, to allow directing a spray of the abrasive media 34 at the localized region 20. In an aspect of the invention, a return conduit 48, having an inlet 50 disposed proximate the outlet 45, may be provided to remove spent media 54 sprayed against the localized region 20 and any detritus abraded away from the surface of the component in the localized region 20. The conduit 38 may be in fluid communication with a vacuum device 52 providing suction to remove the spent media 54 and detritus. The vacuum device 52 may provide a constant vacuum or provide a vacuum at a desired periodic rate for suctioning the spent media 54. The vacuum device 52 may return the spent media 54 to the media hopper 56 or discharge the spent media 54 elsewhere. A skirt 58, sufficiently flexible to conform to a surface being abraded, may be provided to prevent the media 34 from being sprayed outside the desired region 20 and to contain spent media 54 until it can be vacuumed up by the vacuum device 52. In an aspect of the invention, the conduits 42, 48 may be concentric so the spray conduit 42 is contained within the return conduit 48, or vice versa. The sprayer 36 may be configured to be portable, allowing the system 28 to be easily transportable from one gas turbine site to another for onsite repair. A viewing system, such as a borescope 60 coupled to a monitor 62, may be positioned through the same, or another, opening 46 in the inner casing 38 to provide a view inside the gas turbine. Using the viewing system, an operator may view positioning of repair tools within the gas turbine, such as the outlet end 44 of the sprayer 36, and monitor the progress of a repair procedure, such as the cleaning process.

The abrasive media 34 used in the sprayer 36 may include an abrasive material such as alumina, silica, and/or garnets. For example, alumina having a grit size of 16 to 26 mesh may be used (a relatively large grit size compared to conventional grit sizes normally used in gas turbine component stripping) to minimize particle entrapment within cooling holes of the component and mating surface gaps between gas turbine components. In another aspect of the invention, the abrasive media 34 may include a state change characteristic occurring at a temperature lower than an operating temperature of the gas turbine so that the abrasive media 34 changes from a solid state to another state allowing the media 34 to exit the gas turbine, for example, from a gas turbine exhaust outlet, during operation. Such media 34 may include abrasives having relatively low melting points compared to an operating temperature of the gas turbine, and may include consumable abrasives, such as organic abrasives having a hardness capable of abrading gas turbine components and having an ignition point lower than an operating temperature of the gas turbine. For example, the abrasive media 34 may include phenolic resin beads, coal, and calcined petroleum products that burn at temperatures below about 600 degrees centigrade (C.). One advantage of using such relatively low-melting point abrasive media is that in case of entrapment of particles of the media within cooling holes of gas turbine components, the particles would melt and evaporate as the gas turbine is ramped up an operating temperature that is typically substantially higher than the melting point of the abrasive particles. In another aspect, an abrasive material having a relatively low sublimation point compared to an operating temperature of the gas turbine, such as solid carbon dioxide, or dry ice, may be used as an abrasive media.

In another embodiment, mechanical methods may be used for cleaning the region 20, such as by grinding, knurling and needle gunning with tools adapted for use within a gas turbine. In yet another embodiment, the cleaning method may include laser ablating the desired surface portion of the gas turbine component. For example, a portable 100-500 watt laser system (such as a 100 watt, Nd-YAG Portable Laser System, Model A, available from General Lasertronics Corporation) may be configured for use within a gas turbine and used to remove oxides by heating and evaporation.

Figure 1B:
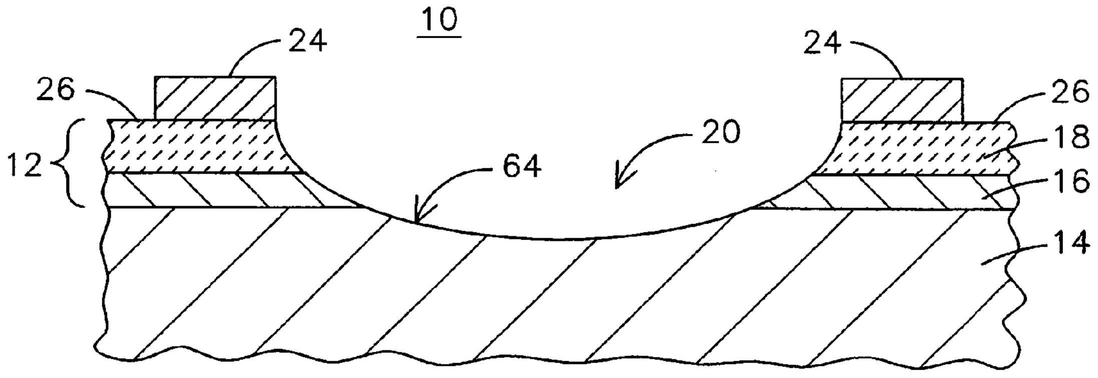
Figure 1C:
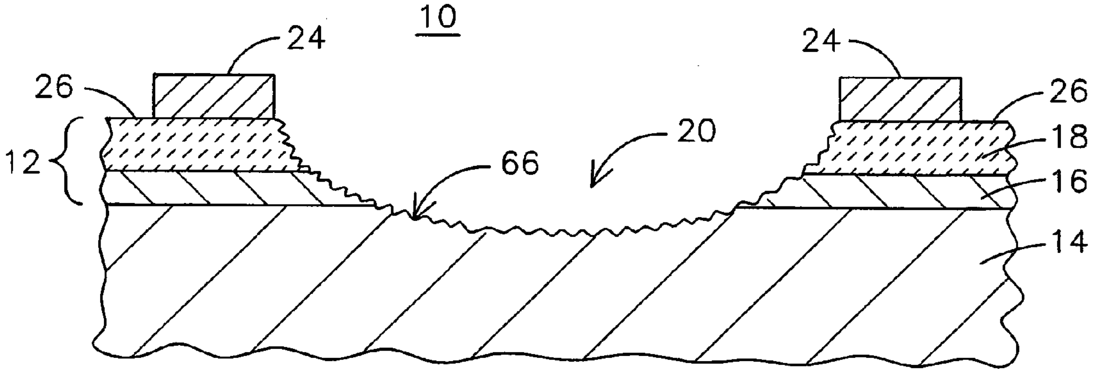

FIG. 1B shows how a locally spalled region may look after being cleaned according to at least one of the methods described above. After such cleaning, a 64 needs to be roughened to ensure that a subsequent application of a repair material will adhere to provide a desired service life for the repair. In an aspect of the invention, a desired roughness ($R_a$), such as between 120 to 220 micro-inches (3 to 5.6 microns), may be achieved by knurling, abrasive spraying, and/or laser grooving. For example, abrasive spraying as described above using 16 to 26 mesh alumina at a spraying pressure of 40 to 80 pounds per square inch (PSI) and using a 4 to 7 inch (0.1 to 0.18 meter) stand-off distance form the region 20 may produce a desired roughened surface 66 as shown in FIG. 1C. In an aspect of the invention, the cleaning and roughening steps may be accomplished by a single abrasive media spray process.

Figure 1D:
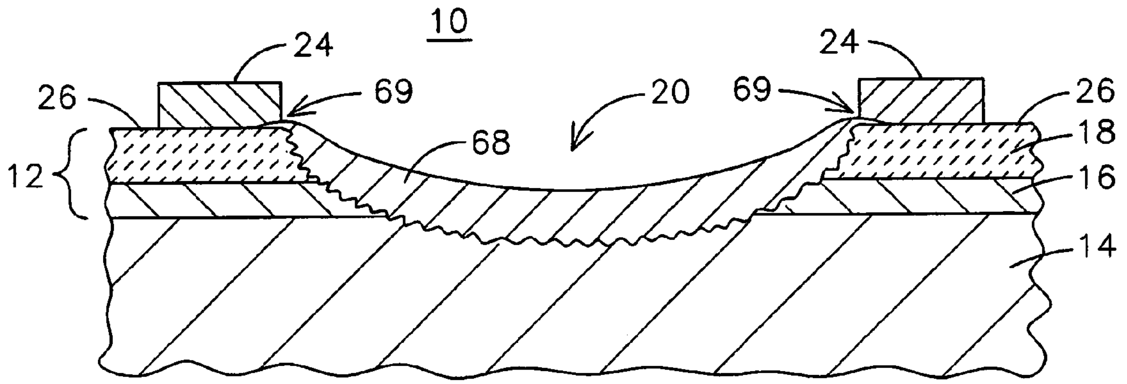

After a desired surface roughness has been achieved, a MCrAlY bond coat may be applied to the desired surface portion in-frame without depositing the bond coat on other surface portions of the component (controlled via appropriate masking of the non-damaged regions on the component) so that the bond coat overlaps the TBC 12 around a periphery 69 of the localized region 20 to be repaired. As shown in FIG. 1D, a MCrAlY bond coat repair 68 may be applied to the roughened surface 66 in a layer having a thickness of from 0.001 to 0.0014 inches (25-350 microns) so that bond coat repair 68 overlaps onto the existing TBC 12 in the region 20, for example, covering the existing bond layer 16 and top coat 18 in order to enhance the bonding of a subsequently applied ceramic layer onto the existing ceramic layer. In an aspect of the invention, the bond coat may be applied to extend under the mask 24 around the periphery 69 to form a feathered edge of the bond coat repair 68 on a top surface of the existing topcoat 18 around the periphery 69.

The MCrAlY bond coat repair 68 may be applied using air plasma spraying (APS), flame spraying, such as oxy-acetylene or oxy-propylene spraying, cold spraying, high velocity oxy-fuel (HVOF) systems, and electro-spark deposition.

Tools for performing these processes may be configured for use within gas turbine, such as within the turbine inner casing 38, by ensuring that the tools are sufficiently small to be inserted 38 through an opening 46 or gap and positionable within the gas turbine to allow coating of the desired region 20 without affecting adjacent surface portions 26. The applied bond coat repair 68 may be controlled to have a surface roughness ($R_a$) in the range of 280 to 600 micro-inches (7.1 to 15.2 microns) to assure adequate bonding between the bond coat repair 68 and a subsequently deposited top coat. If desired, an intermediate coat, such as a ceramic slurry, for example, comprising a calcium oxide or magnesium oxide mixed with a binder, may be applied after the bond coat repair 68 is applied to fill any interfacial gaps between the newly applied bond coat repair 68 and the subsequently applied top coat layer 68.

Figure 1E:
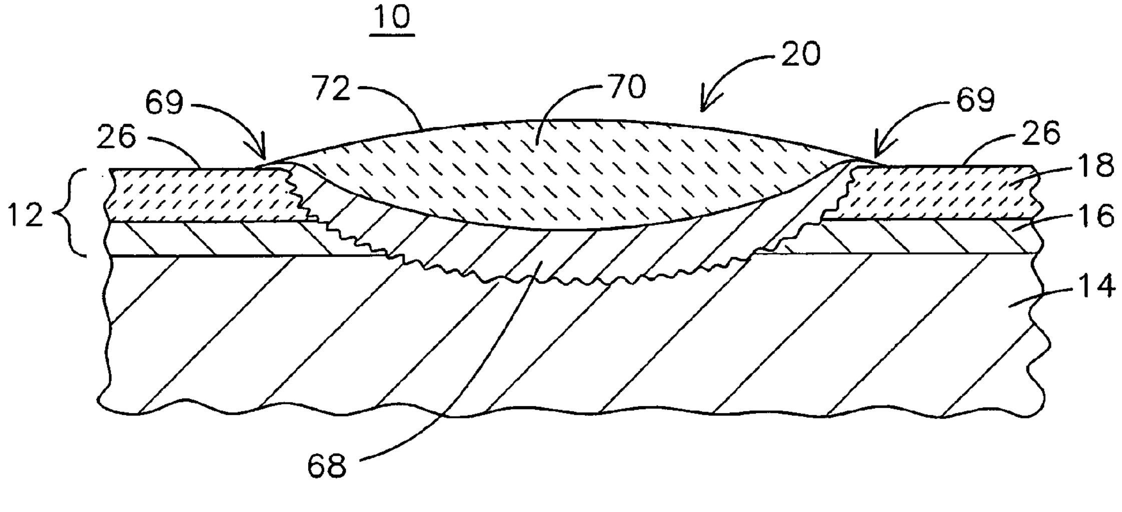

FIG. 1E shows a top coat repair 70 applied to the bond coat repair 68. The top coat repair 70 may include a ceramic material including yttrium and stabilized zirconia. The top coat repair 70 may be applied using an APS process or a flame spraying process, such as oxy-acetylene spraying or oxy-propylene spraying with tools adapted for use within a gas turbine. In a related aspect of the invention, a nano-structured ceramic coating having a relatively higher strain tolerance and a relatively lower thermal conductivity than a conventional ceramic coating may be used over the bond coat repair 68. If desired, a ceramic slurry or paste (for example, comprising a magnesium oxide, aluminum oxide, or calcium oxide mixed with a binder) may be applied after the top coat repair 70 is applied to fill any interfacial gaps between the top coat repair 70 and the surfaces to which top coat repair 70 is applied. The top coat repair 70 may be applied to overlap onto the surface potions 26 around the periphery 69 adjacent to the localized region 20 to allow feathering of the repair onto adjacent undamaged TBC coatings.

Following application of the top coat repair 70, the mask 24 may be removed, and the surface 72 of the top coat repair 70 polished to feather the top coat repair 70 onto the adjacent undamaged surface portions 26 of the component to ensure that the repair contour generally conforms to a contour of the localized area 20 of the component to minimize flow dynamics of fluids flowing over the top coat repair 70. After completing the above described steps, all repair tools may be removed from the within the gas turbine and the turbine may be restarted without requiring reassembly of the repaired components. Advantageously, if an abrasive media 34 having a state change characteristic occurring at a temperature lower than an operating temperature of the gas turbine is used in the cleaning process, the media 34 may be changed from a solid state to another state allowing the media 34 to exit the gas turbine, for example, as the turbine is brought up to operating temperature, thereby avoiding any damage such media 34 may cause if a conventional, non state changing media were used and allowed to remain within the gas turbine after repair.

While various embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A system for in-frame repairing of a thermal barrier coating on a gas turbine component exposed to hot combustion gases comprising:

an abrasive media comprising at least one of phenolic resin beads, coal, and a calcined petroleum product having a state change characteristic occurring at a temperature lower than an operating temperature of the gas turbine so that the abrasive media changes from a solid state to another state allowing the media to exit the gas turbine during operation;

an abrasive media sprayer comprising:

a media hopper for storing the abrasive media;

a compressor for compressing a fluid to be mixed with the abrasive media for producing a pressurized mixed fluid/media spray;

a spray conduit for conducting the spray from a location outside the gas turbine to a location inside the gas turbine;

an outlet end of the spray conduit sufficiently small to be inserted through an inner casing of the gas turbine and within an enclosed portion of the gas turbine exposed to hot combustion gases for directing the spray at a desired surface portion of a component exposed to hot combustion gases within the enclosed portion of the gas turbine; and a return conduit for removing spent media and detritus abraded away from the surface portion of the component from within the enclosed portion to a location outside the gas turbine engine.

2. The system of claim 1, further comprising a vacuum device in communication with the return conduit for providing suction to remove the spent media and the detritus via the return conduit.

3. The system of claim 1, wherein an inlet of the return conduit is disposed proximate the outlet end of the spray conduit.

4. The system of claim 3, wherein the spray conduit and the return conduit are concentrically arranged.

5. The system of claim 3, further comprising a skirt attached to the outlet end sufficiently flexible to conform to the desired surface portion for limiting the spray from being sprayed away from the desired surface portion and for containing the spent media and the detritus.

* * * * *